March 6, 1951   A. S. KYLE   2,544,031
THERMOCOUPLE AUXILIARY AMPLIFIER FOR
CONTROLLING HEATING APPARATUS
Filed Feb. 14, 1947   3 Sheets-Sheet 2

INVENTOR.
Andrew S. Kyle
BY
Chritton, Schroeder,
Merriam & Hofgren
Attys.

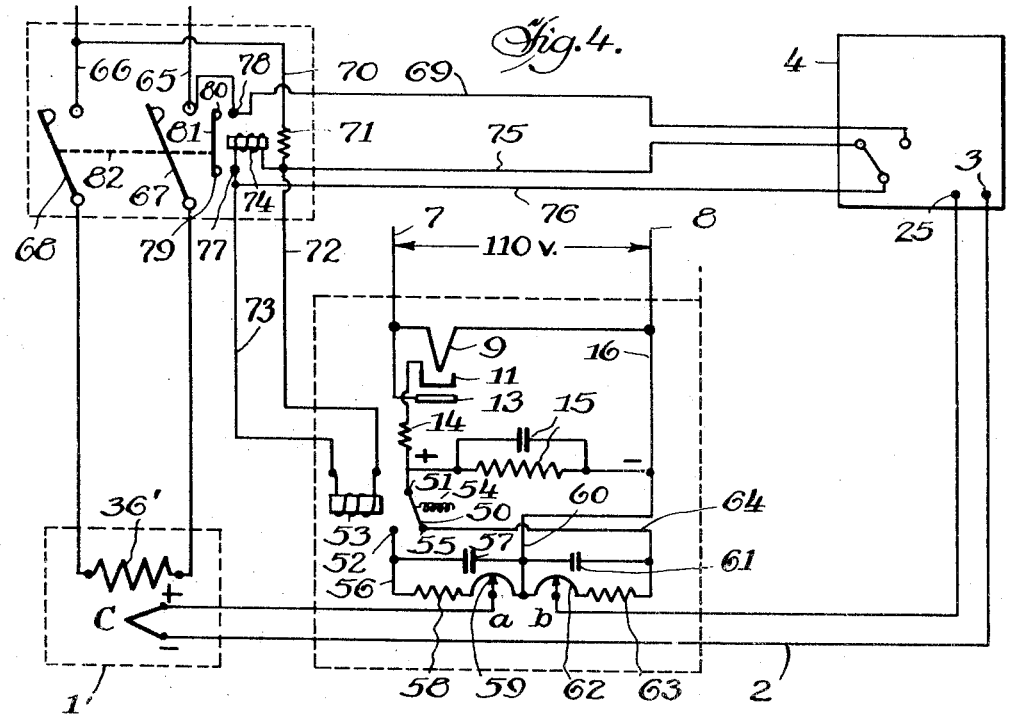
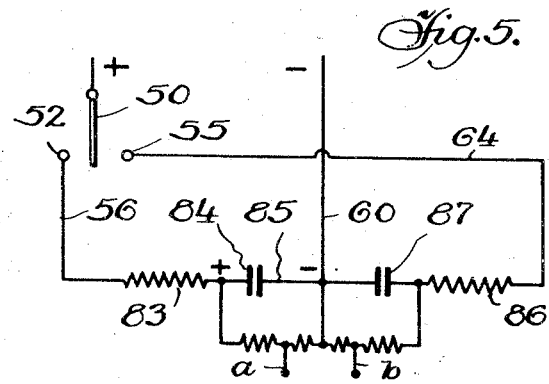
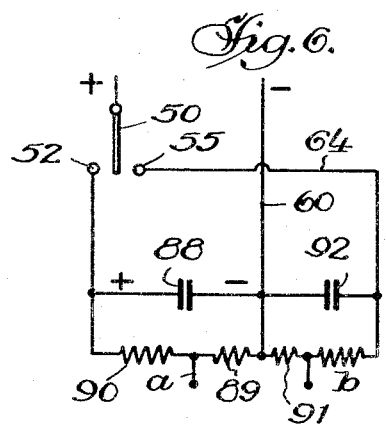
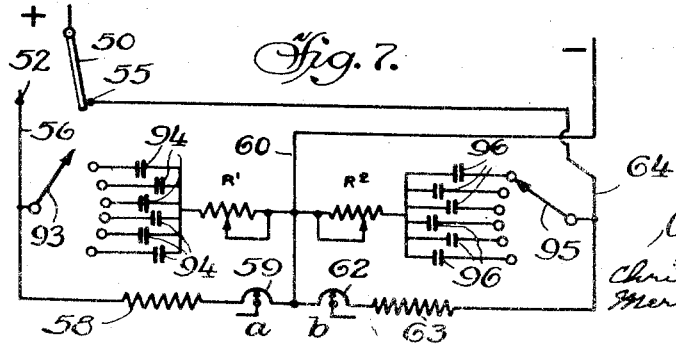

Patented Mar. 6, 1951

2,544,031

UNITED STATES PATENT OFFICE 2,544,031

THERMOCOUPLE AUXILIARY AMPLIFIER FOR CONTROLLING HEATING APPARATUS

Andrew S. Kyle, Chicago, Ill., assignor to Claud S. Gordon Company, a corporation of Illinois Application February 14, 1947, Serial No. 728,672

5 Claims. (Cl. 236—69)

This invention relates to a thermocouple amplifier for use as an auxiliary in controlling the temperature of furnaces, ovens, or other heat controlled processes.

In heating furnaces and the like it is, in many instances, very important that the temperature in the heating zone be held very closely to a constant value. In heating apparatus heretofore known the fluctuations of temperature in the heating zone has been too great for the successful carrying out of many heat controlled processes, with the attendant result of too many rejects in the finished product. Such prior apparatus has been such that the heat control devices have been too sluggish in their operation, requiring too much hunting and overshooting in automatically controlled temperature regulated heating processes.

Among the objects of the present invention are: to overcome the above disadvantages, and provide a more nearly constant temperature in the heating zone; to provide a novel and improved thermocouple amplifier as an auxiliary in controlling the temperature of heat controlled processes; to provide a thermocouple amplifier of the type described, that is unaffected by the time element involved in the operating cycle, that is, one in which the control action is positive and definite at any setting, this action remaining constant for any length of off or on operating time; to provide a thermocouple auxiliary amplifier such as to greatly increase the operational sensitivity of the controlling instrument; to provide a control device auxiliary to the thermocouple, that will anticipate upswings in temperature when the furnace comes on, and will anticipate downswings in temperature when the furnace goes off; and such further objects, advantages and capabilities, inherently possessed by my invention, as will later more fully appear.

My invention further resides in the combination, construction and arrangement of parts illustrated in the accompanying drawings, and while I have shown therein preferred embodiments, I wish it understood that the same are susceptible of modification and change without departing from the spirit of my invention.

In the drawings:

Fig. 4 is a diagrammatic view of the main circuits and parts of a modified form of my invention.

Fig. 5 is a wiring diagram of a modified form of timing circuit for use in the auxiliary amplifier of Figs. 1 and 4.

Fig. 6 is a view similar to Fig. 5 of a further modification of the timing circuit.

Fig. 7 is a view similar to Fig. 5 of a still further modified form of the timing circuit.

Figure 1:
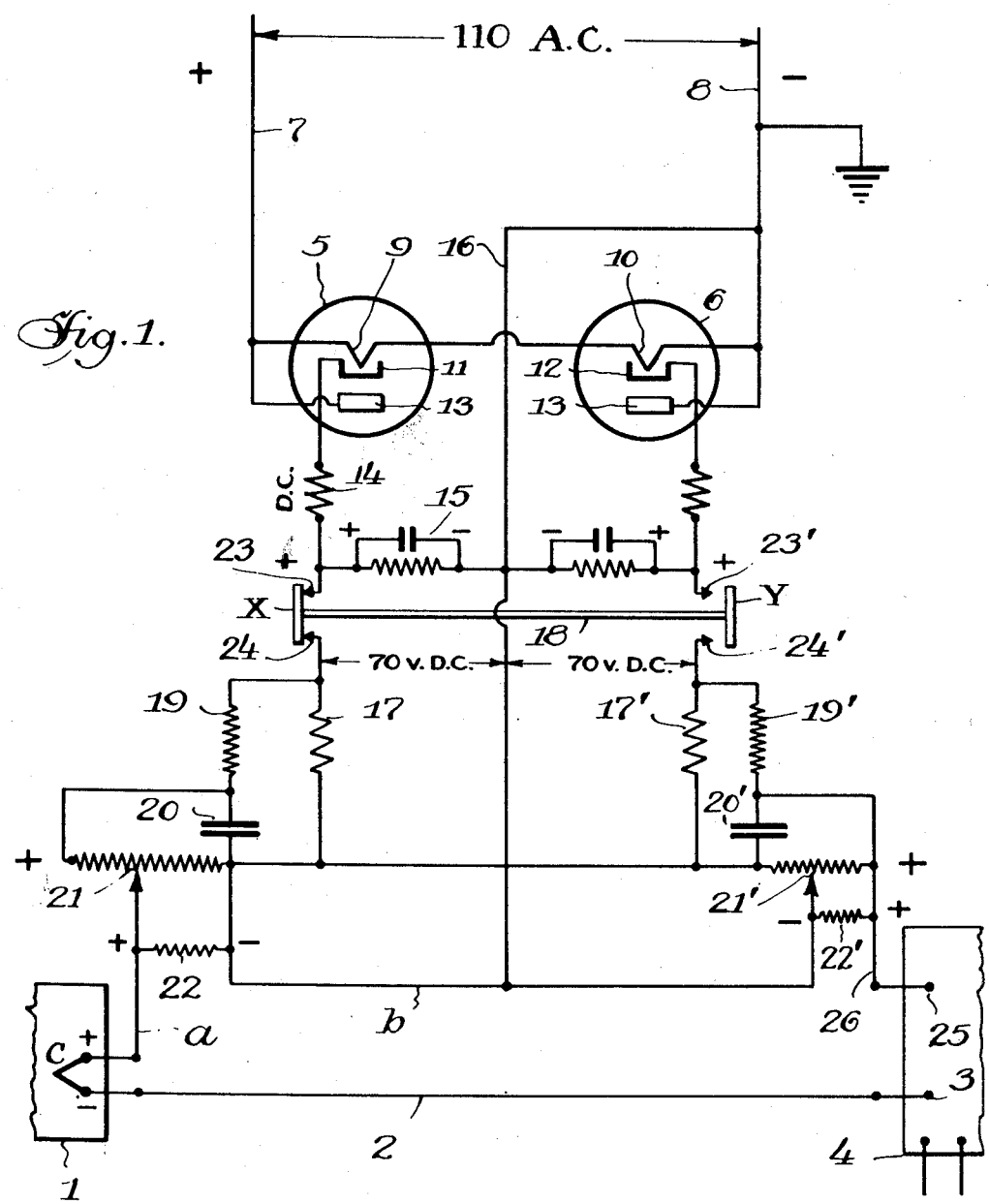
Fig. 1 is a diagrammatic view of the main circuits and parts for carrying out my invention.
Figure 2:
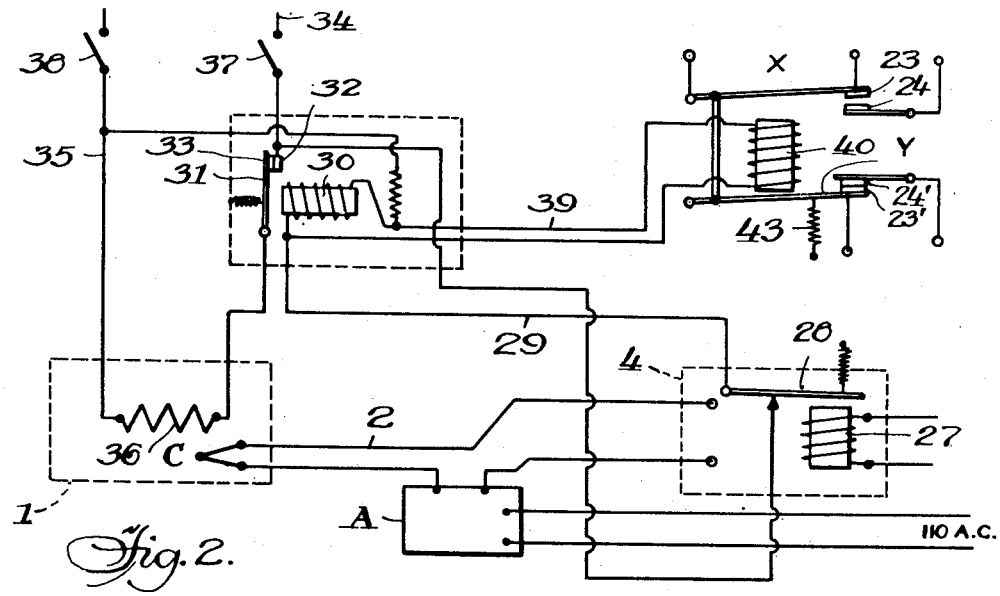
Fig. 2 is a diagrammatic view of the circuits and parts for controlling the connection of the power line to the electric furnace, and for operating the two rigidly connected switches for controlling the auxiliary voltages to the thermocouple.
Figure 3:
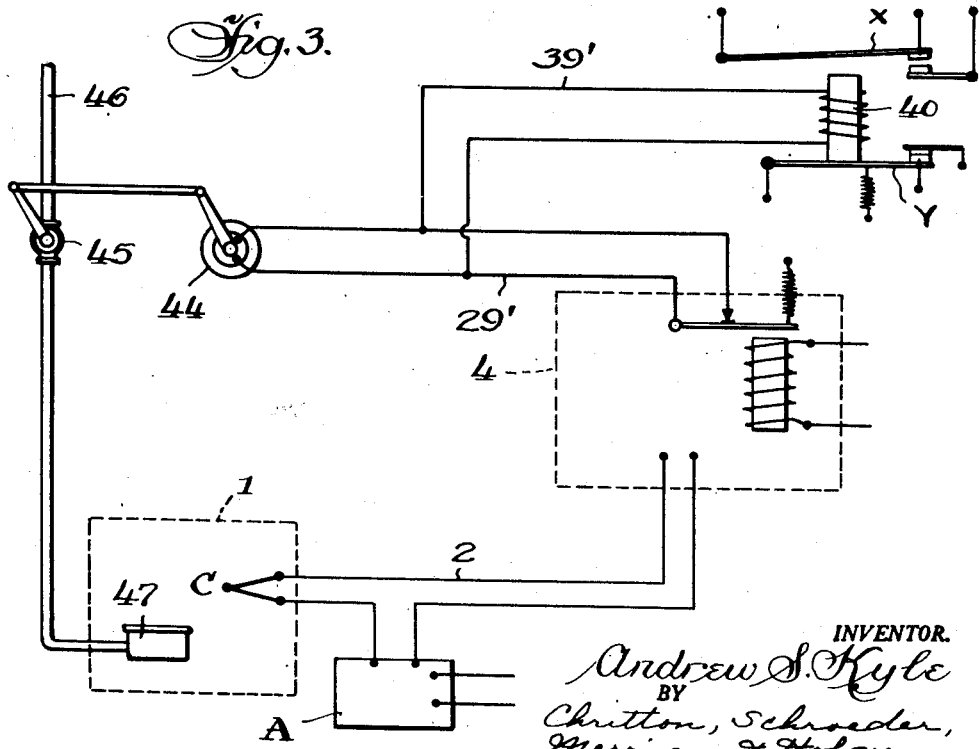
Fig. 3 is a view similar to Fig. 2 but showing the circuit connected for operating a motor for controlling a gas supply line to a gas fired furnace.

In the form shown in the drawings for illustrative purposes, my invention is applicable to either an electric furnace (Figs. 1, 2 and 4–7) or to a gas fired furnace (Figs. 1 and 3). The main control parts are the same for both, but in the use of an electric furnace one of the circuits is used for controlling the connection of an electric power line current to the furnace, whereas in the use of a gas fired furnace this circuit is used for controlling the flow of oil or gas from an oil or gas fuel line to the furnace. The invention will be first described as applying to both, and any specific differences applicable to only one will be later pointed out.

In the form shown in Fig. 1, the heating furnace I has positioned in the heating zone a thermocouple C which, for illustrative purposes only, is referred to as a chromel-alumel thermocouple, but it is to be understood that other metals having thermocouple differences may be used as desired. Leading from the negative terminal of the thermocouple C is a conductor 2 connected at its other end to a binding post 3 or other terminal of a furnace controller casing or housing 4 within which is mounted a sensitive device to be operated by the very small voltage from the thermocouple, which sensitive device in turn makes or breaks a stronger electrical circuit to bring on or cut off the heating medium to the furnace. Such sensitive device and associated parts in the furnace controller casing for turning the heating medium on and off are old and well known and can be purchased on the market, hence they need not be shown or described in detail. However, such old devices as heretofore used permit too wide a swing between the on and off temperatures in the heating zone with the resule of not sufficient precision in the finished product. In the present invention I have overcome this by confining the swing between on and off temperatures in the heating zone of the furnace within very small limits, so as to secure a nearly constant temperature therein.

Assuming the furnace controller to be set for 1500° F., with a chromel-alumel thermocouple the voltage applied to the sensitive element in the furnace controller would be approximately 30 millivolts at that temperature in the furnace. This is the voltage developed by the furnace thermocouple C. For the above type of thermocouple the voltage developed is approximately 20 microvolts per degree Fahrenheit. The sensitivity of a reliable standard pyrometer controller obtainable on the market and in first class condition is such as to require at least 5° above and 5° below the set temperature to operate it.

This means that with the controller set on 1500° F. the temperature of thermocouple C must rise to 1505° in order to operate the instrument and switch the power off, and that it must drop to 1495° in order to switch the power on. This represents a spread or swing of 10° F. due to limitations of the controlling instrument itself.

A further factor in increasing the temperature spread in the furnace is due to the heat lag in the protecting tube. In many applications it is essential that the thermocouple in the furnace be covered by a tube which may be metal, carborundum, porcelain or other suitable material. When such a tube is employed, the heat must pass through this tube in order to reach the thermocouple C. Passage of heat through the tube introduces a time lag in the thermocouple operation that may increase the temperature spread approximately 20 to 40 more degrees.

A further effect is due to the fact that after the furnace is switched off the temperature in the furnace continues to rise due to the difference in temperature between the furnace walls and the furnace load, which effect is called overshooting. This may result in a further increase in the spread or swing of temperature in the furnace.

To prevent these wide variations the auxiliary control of the present invention was developed. Its ultimate function is to increase the sensitivity of the furnace controller so that this controller may operate in a stable manner and still hold the furnace temperature to the set value within narrow limits. With the aid of the present invention, tests have shown that at a setting of 1500° F., the thermocouple C had to experience a change of only 1/6 degree F. in order to switch the furnace on or off. In effect, this increased the sensitivity of the furnace controller 60 times. Without the present invention and without a protecting tube over the thermocouple, when the furnace switches on the temperature at C must rise 10° F. before it switches off, and when the furnace switches off the temperature at C must fall 10° before it switches on. The average temperature of C. will accordingly be in the middle of this 10° spread. Assuming, however, that some of the heretofore mentioned causes of variation in the spread of the temperature in the furnace exist, I will, for illustrative purposes, assume that the spread of temperature is 25° F., and that the average temperature of the thermocouple C will be in the middle of this 25° spread.

With 20 microvolts per degree as the voltage developed by the thermocouple, this means that when the furnace switches on, the voltage of the thermocouple must increase by 500 microvolts to switch the furnace off, and when the furnace switches off the voltage of the thermocouple must decrease by 500 microvolts before the furnace will switch on. The spread greater or less than 25° F., however, can be compensated for by manual manipulation of the thermocouple amplifier hereafter more fully described.

In order to overcome this excessive spread of temperature in the furnace I have provided means for boosting or aiding voltage in the thermocouple when the furnace switches on, and means for bucking or opposing voltage in the thermocouple when the furnace switches off. For example, if the said spread is 25° F. and assuming 20 microvolts per degree in the thermocouple so that a voltage of 500 microvolts therein is required for switching the furnace on or off, by the present invention I am able to inject into the circuit of the thermocouple a boosting voltage of 495 microvolts when the furnace switches on, hence the thermocouple will have to rise only 5 microvolts to switch the furnace off. Likewise if, when the furnace is switched off, 495 microvolts are injected into the thermocouple circuit in the opposite direction, the thermocouple voltage will have to fall through only 5 microvolts to switch the furnace on.

If said spread were 10° F. so that a thermocouple voltage of 200 microvolts is required to switch the furnace on or off, I inject into the thermocouple circuit 195 microvolts of one polarity when the furnace switches on so that the thermocouple voltage will have to rise only 5 microvolts to switch the furnace off. When the furnace is switched off, I inject 195 microvolts of opposite polarity into the thermocouple circuit and the thermocouple voltage will have to fall through only 5 microvolts to switch the furnace on. The above two examples have been given for illustration only, and it is to be understood that by manal manipulation of the thermocouple amplifier I am able to provide for different spreads of temperature in the furnace. This means that by my invention the furnace can be switched on or off by a change in the thermocouple voltage of only approximately 10 microvolts, whereas otherwise at least 200 microvolts would be required.

The auxiliary electronic control in the form shown in Fig. 1 consists of two rectifier tubes 5 and 6 of conventional design, in combination with two symmetrically arranged networks of resistors and condensers employed for filtering and voltage reduction. The purpose of this control is to provide a low D. C. voltage—500 microvolts or less—that may be injected into the thermocouple circuit of a heat controller so that temperature changes may be anticipated and closer control obtained. The two rectifier tubes are connected to a 110 volt A. C. source of supply through the conductors 7 and 8 which are preferably connected to a wall plug or the like (not shown) for plugging into a wall socket, or other suitable source of supply.

When line 7 is positive, current flows therefrom through heaters 9 and 10 to line 8. This heats cathodes 11 and 12, and since plate 13 of tube 5 is connected to line 7 (assumed to be positive at the instant under consideration) current flows from line 7 to plate 13, thence to cathode 11, filter resistor 14, filter-resistor-condenser combination 15, through wire 16 and back to line 8. This establishes a D. C. voltage across the filter-resistor-condenser combination 15 which is applied across resistor 17 when relay switch X is closed. It is here pointed out that the two switches X and Y, which in Fig. 1 are only shown diagrammatically, are rigidly connected together as indicated by the rod 18 so that when one of these switches is closed the other is open and vice versa. The circuit for these two switches is shown in Figs. 2 and 3. Resistor 19 and condenser 20 connected across resistance 17 are employed to provide a time delay that will insure a smooth and gradual application of the D. C. voltage to the variable potentiometer 21. Resistor 22 connected across one section of the potentiometer 21 is employed to adjust its range to appropriate values. As resistor 22 is connected in series with the thermocouple C the arrangement shown permits insertion of a D. C. voltage of correct polarity in the thermocouple circuit. When contact Y is closed, plate 13 of tube 6 being connected to line 8, the network on the right hand side of Fig. 1 injects a D. C. voltage of opposite polarity by means of the rectifier tube 6 and network of resistors and condensers shown in said right hand side which are similar to those shown in the left hand side of Fig. 1. In other words, the right hand network is controlled by switch Y to give one polarity, and the left hand network is controlled by switch X to give opposite polarity.

The switch X when closed connects the two contacts 23 and 24, and the switch Y when closed connects the two contacts 23' and 24'. For the most part the parts of the network on the right hand side of Fig. 1 below the switch Y are indicated by the same reference numerals as the corresponding parts on the left hand side except to add a prime to the former. The circuit from the sensitive device in the furnace controller casing leads from the binding post or the like 25 and line 26 back through the wiring shown in Fig. 1 to the positive terminal of the thermocouple C. The auxiliary circuit for injecting low D. C. voltage of desired polarity into the thermocouple circuit is, as seen from the above description and Fig. 1 of the drawing, connected into one side of the thermocouple circuit.

While not limited thereto, I have obtained good results in one arrangement of furnace by using the following values for some of the parts: resistor 14 one M ohms; a 20 microfarad condenser in the part 15 and a resistor of 10 M ohms therein; a 1 megohm resistance in the resistor 19; 5 M ohm resistance in the resistor 17; a 5 microfarad condenser at 20; 50 ohm resistance in the variable potentiometer 21; and 5 ohm resistance in the resistor 22. It is of course understood that these values may be changed for varying conditions of the particular furnace used.

In Fig. 2 the auxiliary circuit of Fig. 1 is diagrammatically shown as a rectangle A, by which is meant that this represents the same auxiliary circuit as described above for Fig. 1. In Fig. 2 the sensitive device in the furnace controller casing 4 operates conventional electrical parts (not shown) which bring into action a heavier circuit which energizes the relay 27 which moves the switch 28 to close a circuit to the line 29 which energizes the relay 30 to cause switch 31 to swing toward it and close the contacts 32 and 33 to close the power line circuit 34 and 35 which energizes the heater element 36 in the electric furnace 1. The power line may have manual switches 37 and 38 if desired. Line 29 also leads through line 39 to the relay 40 to energize the same and draw switch Y toward itself and close contacts 23' and 24' against the tension of spring 43 which opens switch Y when the relay is deenergized, and closes switch X. These switches X and Y are the same switches X and Y shown in the diagrammatic view in Fig. 1, which in reality are in the auxiliary unit A in Fig. 2, but for sake of clearness have been shown separately in this view.

In Fig. 3 a similar view is shown to illustrate the application of my device for controlling the flow of gas or the like to a burner in the furnace for heating the same in an oil or gas fired furnace. The parts are the same in Fig. 3 as in Fig. 2, except that the relay 30 and the electric power line operated thereby are omitted and the line 39' through relay 40 is connected to the line 29' which leads to a motor 44 or other suitable electrically operated control device to open or close a valve 45 in the gas pipe line 46 to conduct gas to the burner 47 in the furnace.

Any suitable type of rectifier may be used for converting the A. C. current to D. C. current. In Fig. 4 only one rectifier is used, and insofar as they are common the same reference numerals are used as in the left hand upper portion of Fig. 1. Switch 50 is pivoted at 51 to be swingable into engagement with contact 52 when relay 53 is energized, and under action of tension spring 54 is movable into engagement with contact 55 when the relay is deenergized. Line 56 from contact 52 leads to electrolytic condenser 57, resistor 58 and variable potentiometer 59. Line 60 leads from the condenser 57 and potentiometer 59 back to line 8. Also connected with line 60 is a line to electrolytic condenser 61 and a line through the variable potentiometer 62 and resistor 63. Resistor 63 and condenser 61 are in turn connected back by line 64 to contact 55.

As shown in Fig. 4 the power line circuit 65 and 66 has a pair of rigidly connected switches 67 and 68 in turn connected to the heating element 36' in the furnace 1. Line 65 is connected with line 69 which leads back to the controller casing or housing 4. Line 66 is connected with line 70 which passes through resistor 71 and line 72 to relay 53, line 73, relay 74, line 75, through the controller housing and through line 76 back to line 73. Lines 73 and 69 have contact members 77 and 78 respectively, which when relay 74 is energized are contacted by contacts 79 and 80 respectively of switch 81 which is fixed to the connecting stem 82 to which are also rigidly connected switches 67 and 68.

It is thus seen that I have provided in the auxiliary amplifier an improved timing circuit in which electrolytic condensers can be employed. This has not been heretofore possible because the leakage current made such an application unfeasible. In the auxiliary amplifier timing circuits of the present invention satisfactory results have also been obtained by using paper or oil insulated condensers. When switch 50 of Fig. 4 is moved into engagement with contact 52 current flows through line 56, condenser 57, resistor 58 and variable potentiometer 59 and voltage of the correct polarity is injected into the thermocouple circuit. When switch 50 is moved into engagement with contact 55, current flows through line 64, condenser 61, resistor 63 and variable potentiometer 62 and voltage of the opposite polarity is injected into the thermocouple circuit. When the temperature of the thermocouple C drops such an amount as to require more heat for carrying on the heat treatment, the sensitive element in the controller housing will connect lines 69 and 75 and energize relays 74 and 53, thus closing the switches 81, 67, 68 and 50 (50 then contacts 52). This adds more heat to the furnace and at the same time operates the auxiliary amplifier with the correct polarity as earlier described. When the power line is cut off by deenergizing relay 14, relay 53 will also be deenergized and spring 54 will move switch 50 to contact 55 which will operate the auxiliary amplifier through the timing circuit including condenser 61, resistor 63 and variable potentiometer 62, to inject into the thermocouple voltage of the opposite polarity.

In Fig. 5 is shown a timing circuit which may be substituted for that of Fig. 4 with satisfactory results. Fig. 5 illustrates a different arrangement of electrolytic condensers, resistors and potentiometer. In Fig. 5, when switch 50 is moved to contact 52 current flows through resistor 83 and into electrolytic condenser 84, which produces a gradual increase in voltage across 84—85 as the condenser charges, thereby developing a gradually increasing voltage across a—b. When switch 50 is moved to contact 55 current flows through line 64 into resistor 86 and electrolytic condenser 87, and a gradually increasing voltage of opposite polarity appears across a—b.

A timing circuit which overcomes the disadvantage of condenser size is shown in Fig. 6, in which the condensers are charged immediately they are connected to the source of supply and the time delay is obtained as the condenser discharges. When switch 50 is moved to contact 52, condenser 88 charges at once and a voltage appears across a—b which depends for its magnitude on the value of resistance 89 with respect to resistance 90. When switch 50 is moved to contact 55 there is established a voltage of opposite polarity across a—b; however, at the instant of switching, the voltage across 89 and the voltage across 91 are equal. The right hand condenser 92 (Fig. 6) now begins to discharge the opposing voltage at a rate which depends upon the capacity of condenser 88 and the value of resistors 90 and 89. Because of the extremely high capacity of the electrolytic type condensers used in this circuit, long time delays are possible. Extension of this principle, that is, the charging of one condenser with a polarity opposite to that of a second condenser, may be employed in any circuit where long time delays are required.

A further modification is shown in Fig. 7 illustrating means for controlling the voltage input in such a manner as to change the rate of deceleration from point to point by the arrangement of parts R¹ and R² so that the auxiliary voltage will be applied first as an instantaneous value and then have time to increase gradually to the set point. Also as shown in Fig. 7 may be provided individual variation on either side, positive or negative, as for example, on one side, a movable switch 93 permanently connected to line 56 and selectively movable with relation to contacts to a plurality of electrolytic condensers 94 of different capacities, and, on the other side, a movable switch 95 permanently connected to line 64 and selectively movable with relation to contacts to a plurality of electrolytic condensers 96 of different capacities.

I claim:

1. A thermocouple amplifying system for use as an auxiliary in controlling the temperature of furnaces and the like heated by a heating medium in heat controlled processes, comprising a thermocouple adapted to be positioned in the heating zone of a furnace and the like, a furnace controller device, a circuit connecting the thermocouple and the furnace controller device for initiating the on and off operation of the heating medium to the furnace, an auxiliary circuit in said first mentioned circuit, said auxiliary circuit being connected to an approximately 110 A. C. volt circuit, a rectifier tube connected in said auxiliary circuit and receiving current directly from said 110 volt circuit, means connected with the rectifier tube for changing the 110 A. C. voltage to approximately 70 D. C. voltage, a pair of spaced contacts, a single pole double throw switch in circuit with said rectifier tube and intermittently engageable with said contacts, a network of resistances and a condenser connected in circuit from one of said contacts to the thermocouple to anticipate upswings in temperature when the furnace comes on and one of said contacts is engaged by the switch and the other one is disengaged, and a similar network of resistances and a condenser connected in circuit from said other one of said contacts to the thermocouple to anticipate downswings in temperature when the furnace goes off and said other one of said contacts is engaged by the switch, and a back to back time delay circuit for governing the rate at which the auxiliary D. C. voltage is introduced into the circuit of the thermocouple.

2. A thermocouple amplifying system as claimed in claim 1, in which the voltage injected into the thermocouple from one of said networks is 500 microvolts or less of the correct polarity, and the voltages injected into the thermocouple from the other of said networks is 500 microvolts or less of the opposite polarity.

3. A thermocouple amplifying system as claimed in claim 1, in which each of said networks includes resistances of different values, a condenser and a variable potentiometer, one of said networks when its switch is closed injecting a small D. C. voltage into the thermocouple of positive polarity, and the other network when its switch is closed injecting a small D. C. voltage into the thermocouple of negative polarity.

4. A thermocouple amplifying system for use as an auxiliary in controlling the temperature of heat processes, comprising, a temperature controller, a temperature sensitive element for initiating the on and off operation of the temperature controller, a main circuit connecting the temperature controller to said sensitive element, an auxiliary thermocouple amplifier in an auxiliary circuit connected in said main circuit between the sensitive element and the temperature controller for amplifying the temperature changes detected by said sensitive element thereby increasing the overall sensitivity of the control system and greatly increasing the accuracy of temperature control, said amplifier comprising a rectifying device, a filtering network, a switching relay, a voltage proportioning network, said rectifying device, filtering network, relay, and voltage proportioning network being in said auxiliary circuit, a back to back time delay circuit for governing the rate at which the auxiliary D. C. voltage is introduced into the circuit of the thermocouple.

5. A thermocouple auxiliary system for controlling the temperature of furnaces and the like heated by a heating medium in heat controlled processes, comprising, a thermocouple adapted to be positioned in the heating zone of a furnace and the like, a furnace control device, a circuit connecting the thermocouple and the furnace control device for initiating the on and off operation of the heating medium, an auxiliary circuit in said first mentioned circuit, a tube having a heater and a current producing element in said auxiliary circuit, a voltage proportioning network in the auxiliary circuit between the tube and the furnace thermocouple, a switch in said network, a relay for operating said switch, a pair of supply line conductors for the furnace heater, a pair of rigidly connected switches in said supply line conductors, a double pole switch rigidly connected to the connection between said supply line pair of switches, a pair of contacts spaced from said double throw switch for intermittent contact therewith, a line from one of said supply lines to the furnace control device, a line from said relay to the furnace control device, and a second relay in said last mentioned line, which when energized closes said double pole switch with said pair of contacts and closes said supply line switches to add heat to the furnace.

ANDREW S. KYLE.

REFERENCES CITED

The following references are of record in the file of this patent:

UNITED STATES PATENTS

| Number | Name | Date |
|---|---|---|
| 2,105,598 | Hubbard | Jan. 18, 1938 |
| 2,109,222 | Ryder | Feb. 22, 1938 |
| 2,148,491 | Moore | Feb. 28, 1939 |
| 2,220,028 | Smith | Oct. 29, 1940 |
| 2,376,598 | Jones | May 22, 1945 |